(12) United States Patent
Dinh

(10) Patent No.: US 7,378,591 B2
(45) Date of Patent: May 27, 2008

(54) UNIVERSAL RECESSED WHILE-IN-USE ELECTRICAL BOX ASSEMBLY

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/653,123

(22) Filed: Jan. 12, 2007

(65) Prior Publication Data

US 2007/0181328 A1    Aug. 9, 2007

Related U.S. Application Data

(60) Provisional application No. 60/771,787, filed on Feb. 9, 2006.

(51) Int. Cl.
*H01R 13/46* (2006.01)

(52) U.S. Cl. ............................ 174/58; 174/50; 174/63; 220/3.6

(58) Field of Classification Search ............... 174/50, 174/53, 58, 63, 66, 67; 220/241, 4.02, 3.2–3.9; 439/535; 248/906

See application file for complete search history.

(56) References Cited

U.S. PATENT DOCUMENTS

| | | | | |
|---|---|---|---|---|
| 2,297,862 A | * | 10/1942 | Bachmann | 220/3.6 |
| 2,980,283 A | | 6/1961 | Klingler | |
| 4,197,959 A | | 4/1980 | Kramer | |
| 4,381,063 A | | 4/1983 | Leong | |
| 4,599,485 A | * | 7/1986 | Smolik | 174/57 |
| 4,803,307 A | | 2/1989 | Shotey | |
| 4,874,906 A | | 10/1989 | Shotey | |
| 4,927,039 A | * | 5/1990 | McNab | 220/3.7 |
| 4,988,832 A | | 1/1991 | Shotey | |
| 5,042,673 A | * | 8/1991 | McShane | 220/3.7 |
| 5,045,640 A | | 9/1991 | Riceman | |
| 5,171,939 A | | 12/1992 | Shotey | |
| 5,218,169 A | * | 6/1993 | Riceman | 174/67 |
| 5,223,673 A | * | 6/1993 | Mason | 174/53 |
| 5,228,584 A | | 7/1993 | Williams, Jr. | |
| 5,243,135 A | * | 9/1993 | Shotey | 174/67 |
| 5,245,507 A | | 9/1993 | Erickson | |
| 5,280,135 A | | 1/1994 | Berlin et al. | |
| 5,533,637 A | | 7/1996 | Williams, Jr. | |
| 5,731,544 A | | 3/1998 | Burck et al. | |
| 5,981,875 A | | 11/1999 | Kesler et al. | |
| 6,028,268 A | | 2/2000 | Stark et al. | |
| 6,133,531 A | | 10/2000 | Hayduke et al. | |
| 6,570,091 B1 | | 5/2003 | Kesler et al. | |
| 6,727,429 B1 | | 4/2004 | Koessler | |
| 6,737,576 B1 | | 5/2004 | Dinh | |

(Continued)

FOREIGN PATENT DOCUMENTS

JP    55-23754    2/1980

*Primary Examiner*—Dhiru R Patel
(74) *Attorney, Agent, or Firm*—Hoffmann & Baron, LLP

(57) ABSTRACT

A electrical box assembly is provided that includes an electrical outlet box and an adapter plate configured to accommodate electrical components in a single or double gang formation. An engaging mechanism permits the adapter plate to snap into the electrical outlet box without the use of screws or other fasteners. Thus, the adapter plate can be removed and rotated to change the orientation of the adapter plate and any electrical components attached thereto from a vertical to a horizontal orientation, and vice versa.

9 Claims, 13 Drawing Sheets

U.S. PATENT DOCUMENTS

| | | |
|---|---|---|
| 6,753,471 B2 | 6/2004 | Johnson et al. |
| 6,770,816 B2 | 8/2004 | Shotey et al. |
| 6,835,890 B2 | 12/2004 | Dinh et al. |
| 6,891,104 B2 | 5/2005 | Dinh |
| 6,951,983 B1 * | 10/2005 | Gretz .......................... 174/58 |
| 7,276,661 B2 * | 10/2007 | Wegner et al. ................ 174/58 |

* cited by examiner

UNIVERSAL RECESSED WHILE-IN-USE ELECTRICAL BOX ASSEMBLY

CROSS-REFERENCE TO RELATED APPLICATIONS

This application claims the benefit of U.S. Provisional Application No. 60/771,787 filed Feb. 9, 2006, the contents all of which are incorporated herein by reference.

FIELD OF THE INVENTION

The present invention relates to an electrical box assembly and, more particularly, to a recessed box and cover that can accommodate either a horizontally or a vertically aligned receptacle therein without having to reorient the box or cover. And further, a box that can accept either a single receptacle or a plurality of receptacles therein.

BACKGROUND OF THE INVENTION

Electrical boxes provide a housing for electrical components such as outlets and switches when installed in the walls, ceilings or floors of buildings. Electrical boxes are typically secured to a support structure such as a wall stud and aligned with an opening in a covering material, such as wall board or siding. Boxes may be employed to house electrical components both in and out of doors.

Outdoor applications typically utilize electrical boxes which can resist contamination, such as water and dirt, created by exposure to the elements. Indoor applications such as in a bathroom or industrial setting may also subject an installed electrical component to contamination from cleaning fluid or other debris. Typical outlet boxes include a housing which holds the electrical component and a bracket having a flange which abuts the front face of the wall. In order to satisfy the requirements of such applications, electrical boxes also typically include a cover to shield the electrical components from contamination. Electrical box covers of the prior art may include openings therein to permit cords to extend there through, thereby allowing an electrical outlet to be used even when the cover is closed.

One such while-in-use electrical box is disclosed in U.S. Pat. No. 4,988,832. This electrical box includes a recess configuration such that the electrical component is recessed from the front surface of the wall in which it is installed. The electrical box includes a housing attachable to a wall stud and a bracket securable thereto. The bracket has a flange which abuts against a wall surface and a base which aligns with the front face of an electrical component. Although the recess configuration provides protection to the electrical component, the configuration does not accommodate more than one outlet. More importantly, the configuration disclosed in U.S. Pat. No. 4,988,832 does not accommodate either a horizontally or a vertically aligned receptacle therein without having to reorient the box or cover.

Other outlet covers are designed to protect an electrical device, but do not include an electrical box. Instead, the box which houses the electrical outlet is already attached to a stud, for example, and the cover is designed to be applied around the outlet. One such device is disclosed in U.S. Pat. No. 5,280,135. This electrical box includes a base plate, an insert to the base plate and a cover that hingedly attaches to the base plate. The base plate has an aperture of sufficient size to accommodate an electrical outlet in different orientations. The insert fits within the aperture of the base plate and is capable of encompassing the face of an electrical device. However, as stated above, this device is not a unitary device that includes an electrical box and, therefore, requires a user to separately purchase and attach the electrical box.

Accordingly, a need exists for a unitary recessed box and cover that, once installed, can accommodate either a horizontally or a vertically aligned receptacle therein in a single or double gang formation without having to reorient the box or cover.

SUMMARY OF INVENTION

The present invention provides an electrical box assembly. The electrical box assembly includes an electrical outlet box having a rear wall perimetrically bounded by a sidewall extending therefrom. The electrical outlet box is adapted to receive one electrical component or the box can receive more than one electrical component. The electrical box assembly also includes an adapter plate. The adapter plate includes a securement mechanism for securing the electrical components to the adapter plate. The adapter plate further includes an aperture that is configured to accommodate the one or more than one electrical component. The assembly also includes an engaging mechanism having a fixed structure on the adapter plate which correspondingly interconnects with a fixed structure on the sidewall of the electrical box. The engaging mechanism removably couples the adapter plate to the electrical outlet box in either the horizontal or vertical position.

In a preferred embodiment of the invention the fixed structure on the adapter plate includes a plurality of extensions extending from the adapter plate. In addition, the fixed structure on the sidewall of the electrical box includes a plurality of slots configured to receive the extensions. Because the adapter is made of a resilient material, the adapter plate can deflect, permitting the extensions to snap into the slots, as opposed to using a mechanical fastener, such as a screw, to attach the adapter plate.

In a preferred embodiment, the engaging mechanism includes a plurality of adapter plate support members projecting inward from the sidewall or up from the back wall. A plurality of adapter plate mounting extensions extending from the adapter plate engage a slot in the top of the adapter plate support members, thereby removably attaching the adapter plate to the electrical outlet box.

The adapter plate has a first position corresponding to a first orientation and a second position corresponding to a second orientation. The adapter plate is removably coupled to said electrical box in one of said first or second positions.

In this way, the user can "pop-out" the adapter plate and re-orient adapter plate by rotating adapter plate a fixed number of degrees (i.e. 90 degrees for a square box, other degrees for other shaped boxes) and reinserting the adapter plate mounting extensions into the adapter plate mounting slots. Thus, for at least square boxes, the orientation of the adapter plate can be changed from horizontal to vertical, and vice versa, without having to remove the electrical outlet box from the structure to which it is attached.

In a preferred embodiment, the electrical box assembly further includes a mounting ring adapted to be attached to a structural surface and to receive said electrical outlet box. In another preferred embodiment, the electrical box assembly includes a cover pivotally attached to the electrical outlet box. The cover is movable between an open and closed position. In another preferred embodiment, the electrical box assembly further includes a latching mechanism configured to releasably keep the cover in said closed position. In another preferred embodiment, the electrical box assembly includes a member for receiving and retaining an electrical cord.

It is an advantage of the present invention to provide an electrical box assembly having an adapter plate that can be removably inserted into the electrical outlet box without the use of screws or other mechanical fasteners. This permits the user to save time in installation and saves cost for the manufacturer.

It is a further advantage of the present invention to permit the user to easily reorient the adapter plate from a horizontal to a vertical position (or a first to a second position), and vice versa, without having to remove the electrical box from the structure to which it is attached.

Another advantage is the ability to install a single receptacle therein or a multitude of receptacles without having to change the box.

DETAILED DESCRIPTION OF THE INVENTION

The present invention provides a recessed box and cover that, once installed, can accommodate either a horizontally or a vertically aligned receptacle therein without having to reorient the outlet box or cover. It can also accommodate either a single receptacle therein or a plurality of receptacles therein.

Figure 1:
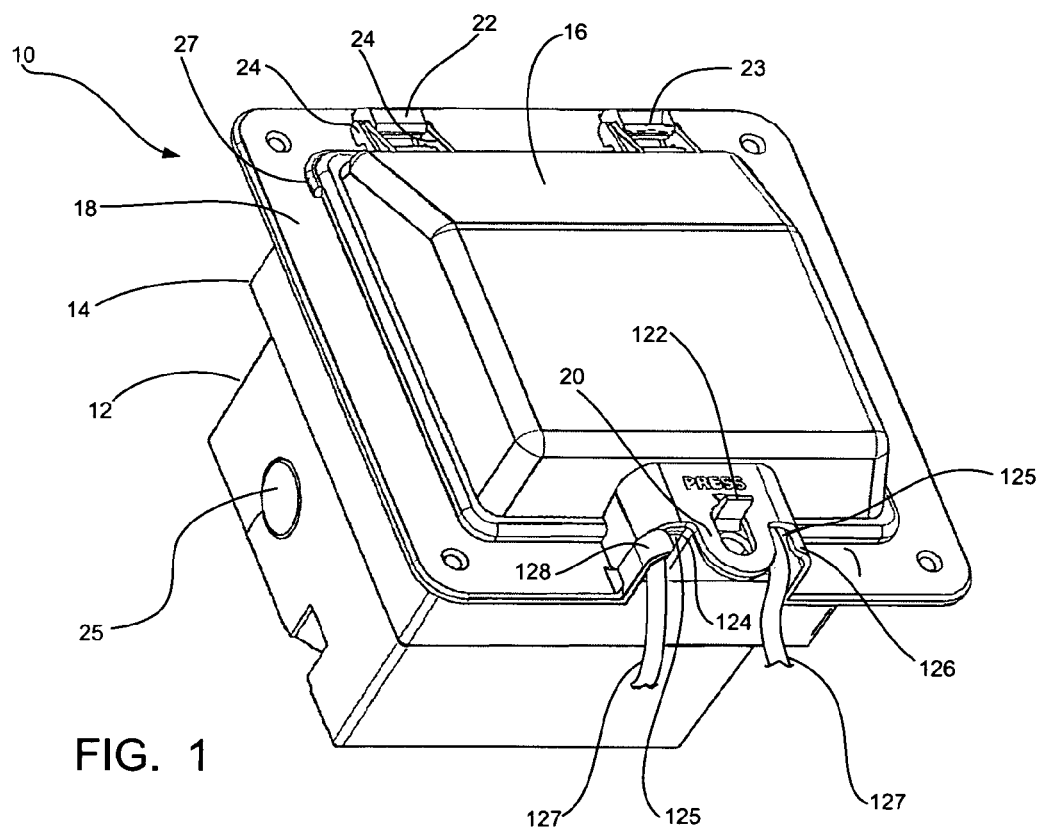
FIG. 1 is a front perspective view of an electrical box assembly of the present invention.
Figure 2:
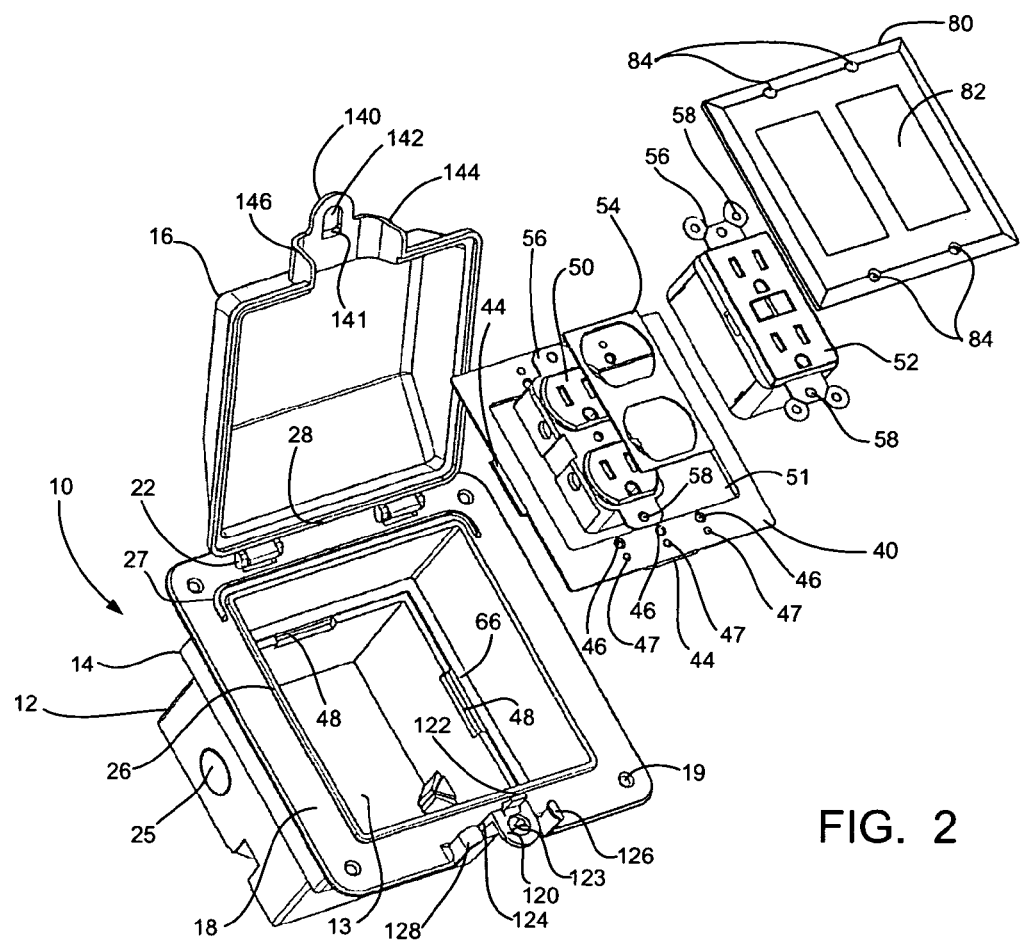
FIG. 2 is an exploded perspective view of the electrical box assembly of FIG. 1.
Figure 3:
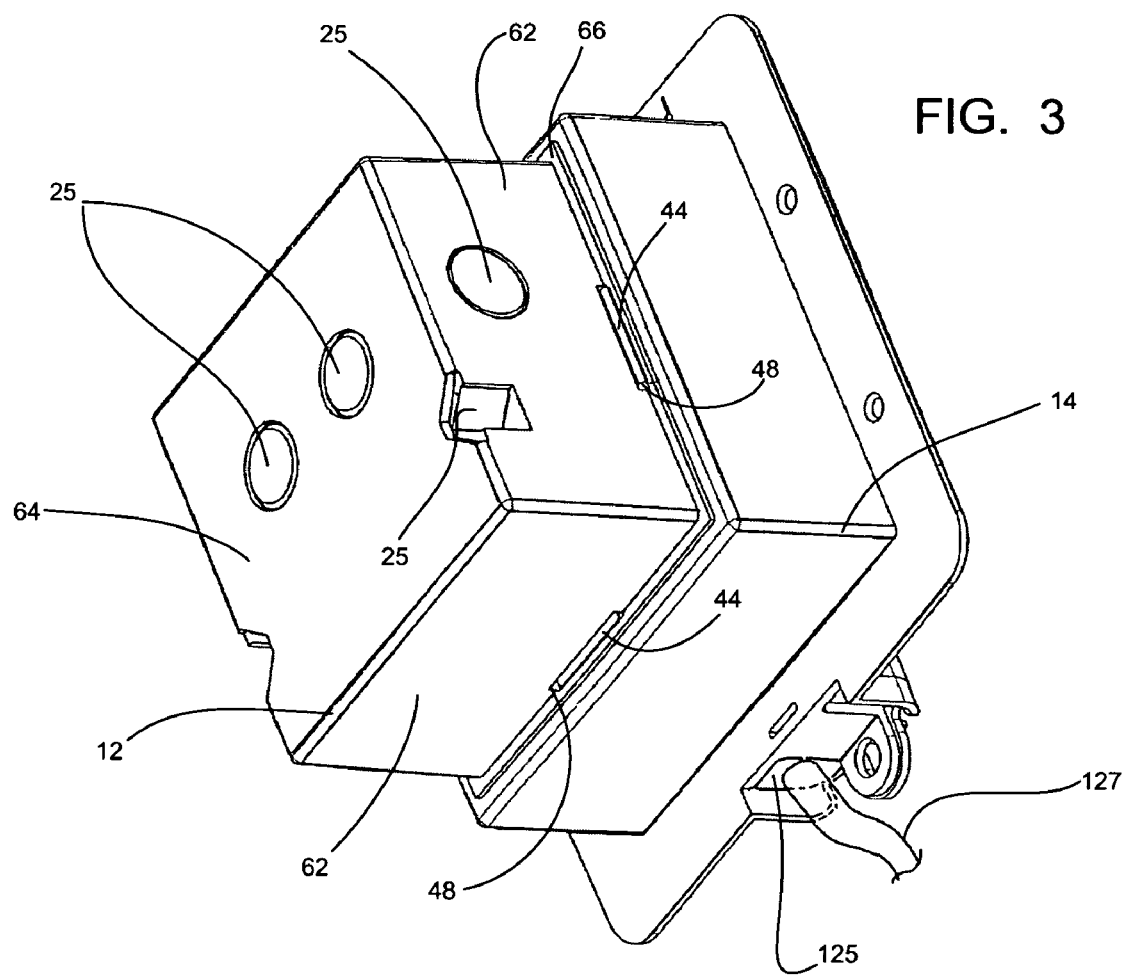
FIG. 3 is a rear perspective view of the electrical box assembly of FIG. 1.

With reference to FIGS. 1-3, the present invention includes an electrical box assembly 10 having an electrical outlet box 12. In the preferred embodiment, electrical box assembly 10 may be formed of a plastic material, such as polycarbonate, polyvinyl chloride, polyethylene, or polypropylene. However, it is within the contemplation of the present invention that electrical box assembly 10 may be formed of a variety of materials. In addition, portions of electrical box assembly 10 may be formed of plastic, while other portions may be formed of a different material, such as metal.

Electrical outlet box 12 is adapted to receive a variety of electrical components, such as a duplex outlet 50, ground fault circuit interrupt (GFCI) 52, switch (not shown), voice/data connector (not shown), etc. Electrical outlet box 12 includes a rear wall 64 perimetrically bounded by side walls 62. Side walls 62 and rear wall 64 form a cavity within which the electrical component resides. Side walls 62 continue forward ending in a face flange 18 that extends outward perpendicularly from the forward end of side walls 62. Referring to FIG. 3, side walls 62 and/or rear wall 64 may include knock-outs 25 formed thereon to permit the passage of electrical wires into electrical box 12.

Figure 4:
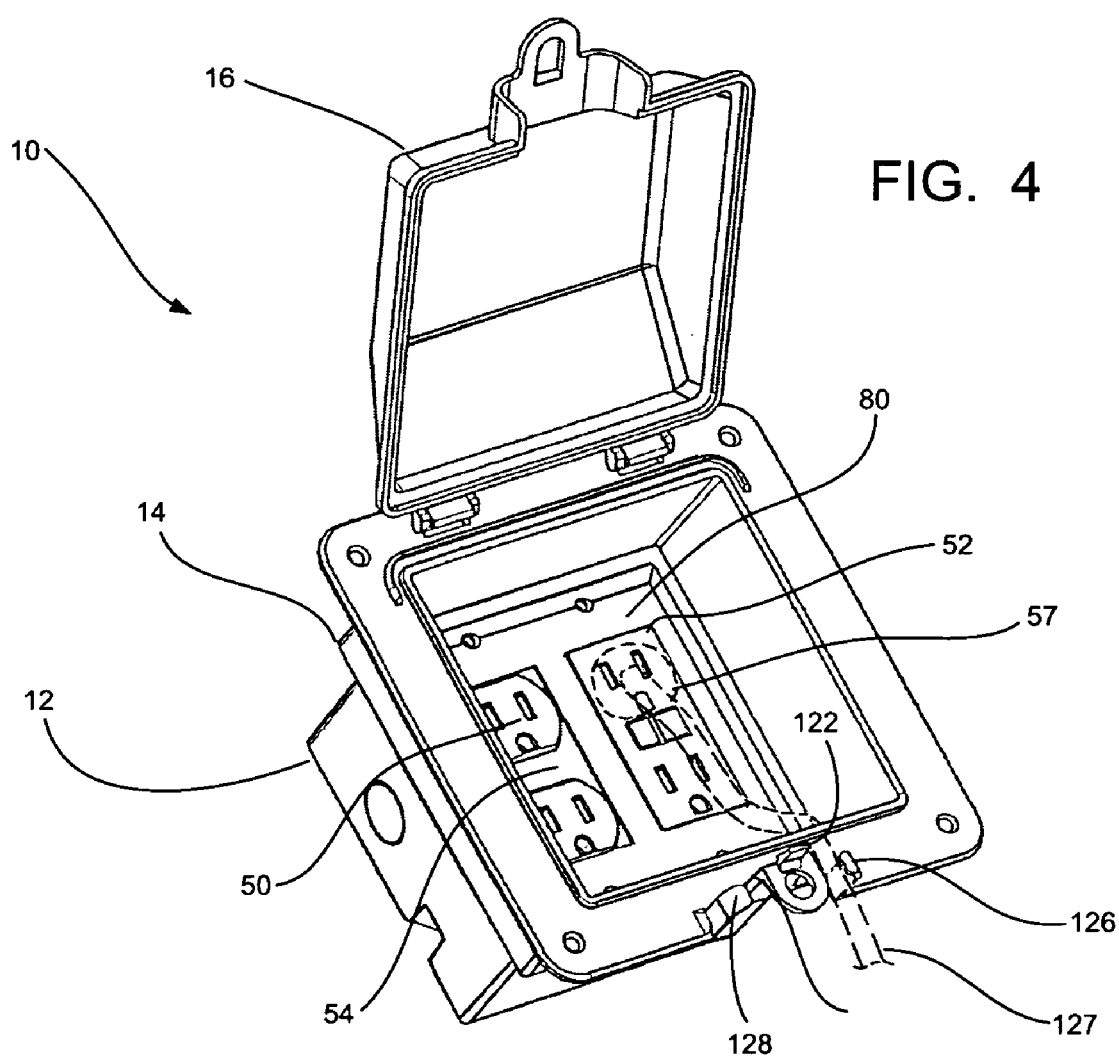
FIG. 4 is a perspective view showing a double gang configuration installed in the electrical box.

Referring to FIGS. 2-3, side walls 62 of electrical outlet box 12 can include a step-out 66 where side walls 62 extend outwardly. Side walls 62 then continue to extend forward to face flange 18. The portion of side walls 62 from step-out 66 to the face flange 18 of the electrical box 12 forms a housing 14. Referring to FIG. 4, housing 14 provides a cavity sufficient to house a plug 57 of an electrical cord when the plug 57 is plugged into an electrical outlet 52 attached to electrical outlet box 12. Preferably, electrical outlet box 12 and housing 14 are manufactured as one piece.

As shown in FIGS. 1-3, electrical box assembly 10 also includes a cover 16 pivotally attached to electrical outlet box 12, movable between a closed position and an open position. Cover 16, when in a closed position, helps protect the electrical component residing in electrical outlet box 12 from the elements, such as dirt, water, moisture, sun, etc. In a preferred embodiment, cover 16 is pivotally attached to face flange 18. Cover 16 may be attached to face flange 18 via a hinge 22. Preferably, the hinge is located at the top side of cover 16 and face flange 18, thereby causing gravity to pull the cover closed. However, the hinges connecting cover 16 and face flange 18 may be located on any side of the face flange 18. In a preferred embodiment, cover 16 includes arms 24. An integral pin 23, shown in FIG. 1, is attached between arms 24. The pins act in cooperation with hinges 22 located at the top of face flange 18 to pivotally connect cover 16 to the electrical box assembly 10.

Referring to FIG. 2, electrical box assembly 10 also includes an upwardly extending ridge 26 that surrounds the inside perimeter of face flange 18. Ridge 26 defines an opening 13 into electrical outlet box 12. Electrical box assembly 10 also includes an upwardly extending rim 27 that resides slightly above ridge 26 on the top side of flange 18 and a portion of the upper sides of flange 18. When cover 16 is in a closed position, the top inner edge 28 of cover 16 fits within the space between ridge 26 and rim 27. This configuration directs rain water or moisture around and away from the electrical device within the electrical box assembly.

Referring to FIG. 1, the electrical box assembly 10 also includes a latching mechanism 20. Referring to FIG. 2, latching mechanism 20 includes a first mating member 120 and a second mating member 140. As shown in FIG. 2, first mating member 120 extends perpendicularly outward from the bottom edge of face flange 18. First mating member 120 includes an L-shape resilient member 124 that extends perpendicularly outward from the bottom edge of face flange 18, and then downward. The downward portion of resilient member 124 includes a first latching aperture 123. Resilient member 124 also includes a latching tang 122. Latching tang 122 extends outward from resilient member 124 in a direction generally perpendicular from face flange 18. Latching tang 122 is generally triangular in shape, with the broader base side of the triangle being closer to face flange 18, and the narrower angle further away from face flange 18.

First mating member 120 also includes cord holder extensions 126 and 128 that reside on either side of resilient member 124. The space 125 between cord holder extensions 126 and 128 and resilient member 124 is sufficient for an electrical cord 127 attached to outlet 50 or 52 to extend therebetween. Cord holder extensions 126 and 128 hold the cord between resilient member 124 cord holder extensions 126 and 128 when the cord 127 is placed in position.

Referring further to FIG. 2, second mating member 140 is generally U-shaped and extends generally outward from the bottom edge of cover 16. Second mating member also includes side walls 144 and 146 that span the depth of the bottom edge of cover 16. Second mating member 140 also includes second latching aperture 142.

In operation, referring to FIG. 2, when cover 16 is closed, latching tang 122 engages with the top edge 141 of second latching aperture 142 of second mating member 140 such that cover 16 remains secured in a closed position. More specifically, as shown in FIG. 1, when cover 16 is in a fully closed position, latching tang 122 goes through second latching aperture 142 until the broader base side of the triangle of latching tang 122 engages the outer side of second mating member 140.

Referring to FIGS. 1-4, when cover 16 is in a closed position, the cavity formed by housing 14 and the inside of cover 16 is sufficient to house a plug 57 of an electrical cord 127 when the plug is plugged into an electrical outlet attached to electrical outlet box 12. Side walls 144 and 146 of second mating member 140 permit the electrical cord 127 to pass through the space 125 between cord holder extensions 126 and 128 and resilient member 124 when cover 16 is in a closed position. Cord holder extensions 126 and 128 align with side walls 144 and 146, respectively, of side walls 144 and 146 of second mating member 140. Thus, cover 16 is able to be placed in a closed position while the outlet is in use.

In addition, when cover 16 is closed, first latching aperture 123 and second latching aperture 142 align such that a locking device can be passed through both, thereby locking cover 16 in a closed position. Although a preferred latching mechanism is described herein, it is within the contemplation of the invention that any number of latching mechanisms could be employed to maintain cover 16 in a closed position.

Figure 5:
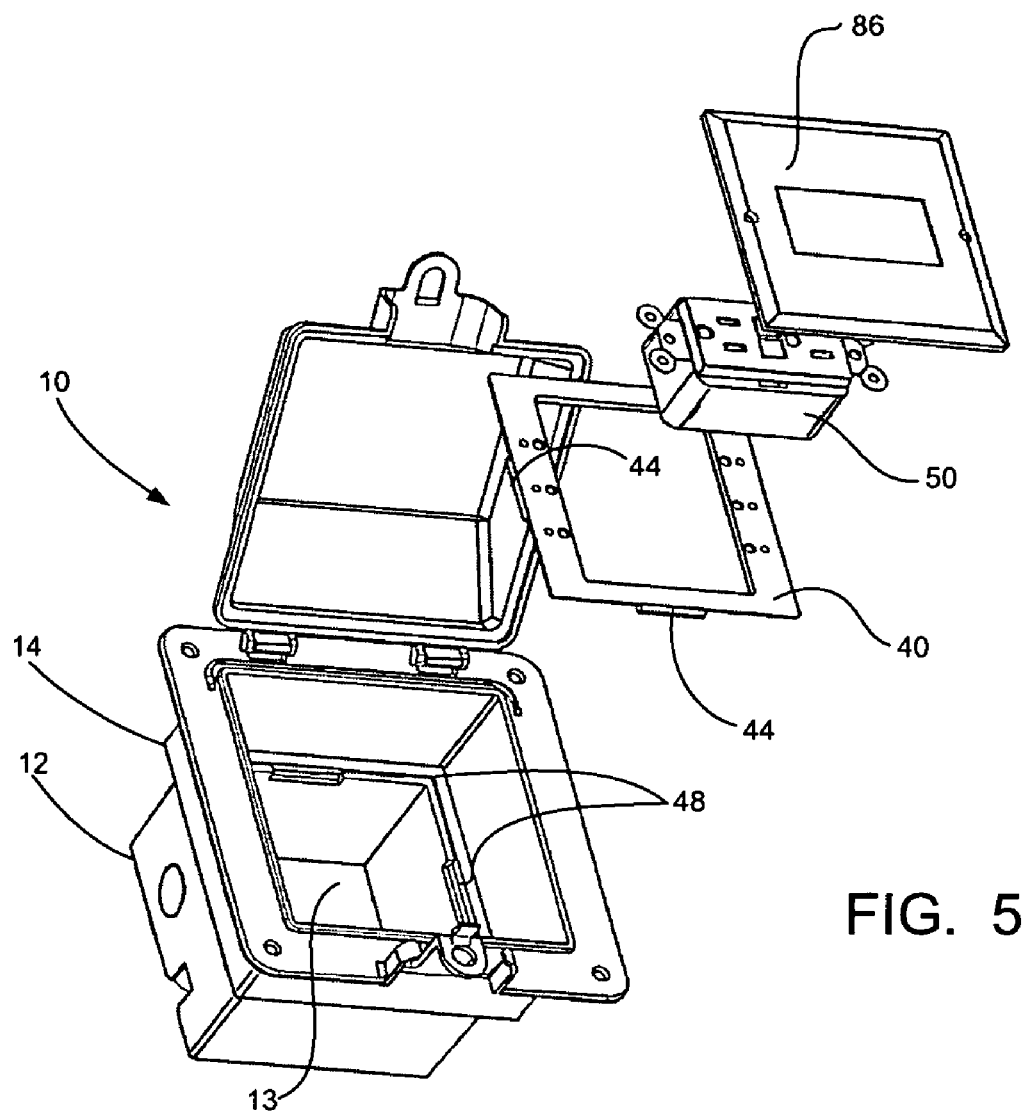
FIG. 5 is an exploded perspective view of an electrical box assembly having a single gang configuration.

With reference to FIGS. 2 and 5, the electrical box assembly 10 also includes an adapter plate 40. Adapter plate 40, although shown as rectangular in shape, can be any shape configured to fit within or around the cavity formed by the side walls 62 of outlet box 12 (which can also be shaped other than rectangular). Adapter plate 40 includes an electrical device aperture 51 that is sized to accommodate a conventional electrical device, such as duplex outlet 50 or GFCI outlet 52 or the like. As shown in FIG. 2, electrical device aperture 51 in adapter plate 40 can be large enough to accommodate a double gang configuration if so desired, i.e., two electrical components, such as outlets or switches.

Adapter plate 40 includes adapter plate screw apertures 46. In a preferred embodiment, a set of three adapter plate screw apertures 46 are located on each of two opposite sides of adapter plate 40 to mount an electrical device. The set of three adapter plate screw apertures 46 located on each of two opposite sides of adapter plate 40 permits adapter plate 40 to accommodate either a double gang formation (outer apertures) or a single gang formation (middle aperture).

As shown in FIG. 2, the electrical component 50, 52 includes tabs 56 having screw apertures 58. To attach the electrical component to adapter plate 40, screws (not shown) are threaded at the top and bottom of the electrical component through both the electrical component screw aperture 58 and the adapter plate screw aperture 46.

Adapter plate 40 is configured to detachably connect to electrical box assembly 10. As shown in FIG. 2, adapter plate 40 in this embodiment includes adapter plate mounting extensions 44 but other concave or convex configurations for an inter-mating structure are equally likely. Preferably, adapter plate mounting extensions 44 are integral with adapter plate 40. Adapter plate mounting extensions 44 as shown are used to detachably connect adapter plate 40 to electrical outlet box 12, without the use of screws. Adapter plate mounting extensions 44 are preferably located in the center of each side of adapter plate 40 and extend out from adapter plate 40 generally in the same plane as adapter plate 40. Adapter plate mounting extensions 44 need only extend out from adapter plate 40 enough to engage adapter plate mounting slots 48, for example, 1-5 mm. The length of each adapter plate mounting extension 44 along the side of adapter plate 40 is slightly less than adapter plate mounting slots 48.

As shown in FIGS. 2-3, adapter plate mounting slots 48 are located at or slightly rearward (i.e., toward the rear wall 64 of outlet box 12) of step-out 66 in side walls 62. Adapter plate mounting slots 48 need only be slightly larger/longer than mounting extensions 44 so as to permit adapter plate 40 to be detachably connected to electrical box assembly 10. Adapter plate 40 and/or adapter plate mounting extensions 44 are preferably made of a resilient material, thereby permitting the adapter plate 40 and/or adapter plate mounting extensions 44 to deflect. This deflection permits adapter plate 40 to be snapped into electrical outlet box 12 without the use of mechanical fasteners, such as screws, rivets, etc so that a moderate amount of force is necessary to disengage adapter plate 40 from electrical outlet box 12. In addition, step-out 66 in side walls 62 forms a rear platform within the perimeter of the inside of side walls 62 which supports adapter plate 40. Of course, other configurations of extensions 44 and slots 48 will equally suffice, such as a female mating component being on adapter plate 40 with a male mating component being secured to box 12. Also, the mating component on box 12 can extend from its sidewalls or its backwall, whatever is desired.

As shown in FIG. 2, electrical box assembly may also include a face plate 80. Face plate 80 is sized to fit within the cavity formed by side walls 62. Face plate 80 is designed to cover the electrical component from view while leaving the face of the electrical component accessible through face plate aperture 82. Face plate aperture 82 can be of various configurations to fit different electrical components. For example, face plate aperture 82 as shown in FIG. 2 is fitted to accommodate a GFCI. If a face plate with an aperture sized for a GFCI is used to cover a duplex outlet, a duplex outlet cover 54 can be interposed between the duplex outlet 50 and face plate 80. This would be especially useful when a GFCI 52 and duplex outlet 50 are coupled in a double gang formation as shown in FIG. 2 and FIG. 4. Face plate 80 is attached to adapter plate 40 by passing a screw through face plate screw apertures 84 and threading the screw (not shown) through face plate mounting apertures 47 in adapter plate 40.

In operation, electrical box assembly 10 can be attached, for example, to a wall or stud. Referring to FIG. 2, electrical box assembly can be attached to a wall by passing the shaft of a nail or screw through face flange wall aperture 19. Wires to be attached to an electrical device can be pulled through one or more knock-outs 25 in electrical outlet box 12. An electrical device, such as duplex outlet 56 or GFCI 52, is attached to adapter plate 40 by threading the screws through electrical device screw aperture 58 and through adapter plate screw aperture 46. As stated above, adapter plate screw apertures 46 are placed such that adapter plate 40 and adapter plate aperture 51 can accommodate either a double or single gang formation of electrical devices. After or before the electrical component is mounted to adapter plate 40, adapter plate mounting extensions 44 are inserted into adapter plate mounting slots 48, thereby detachably connecting adapter plate 40 with the electrical components to the electrical box assembly 10. Face plate 80 can then be attached to adapter plate 40 by passing a screw through face plate screw apertures 84 and threading the screw through face plate mounting apertures 47 in adapter plate 40.

Figure 6:
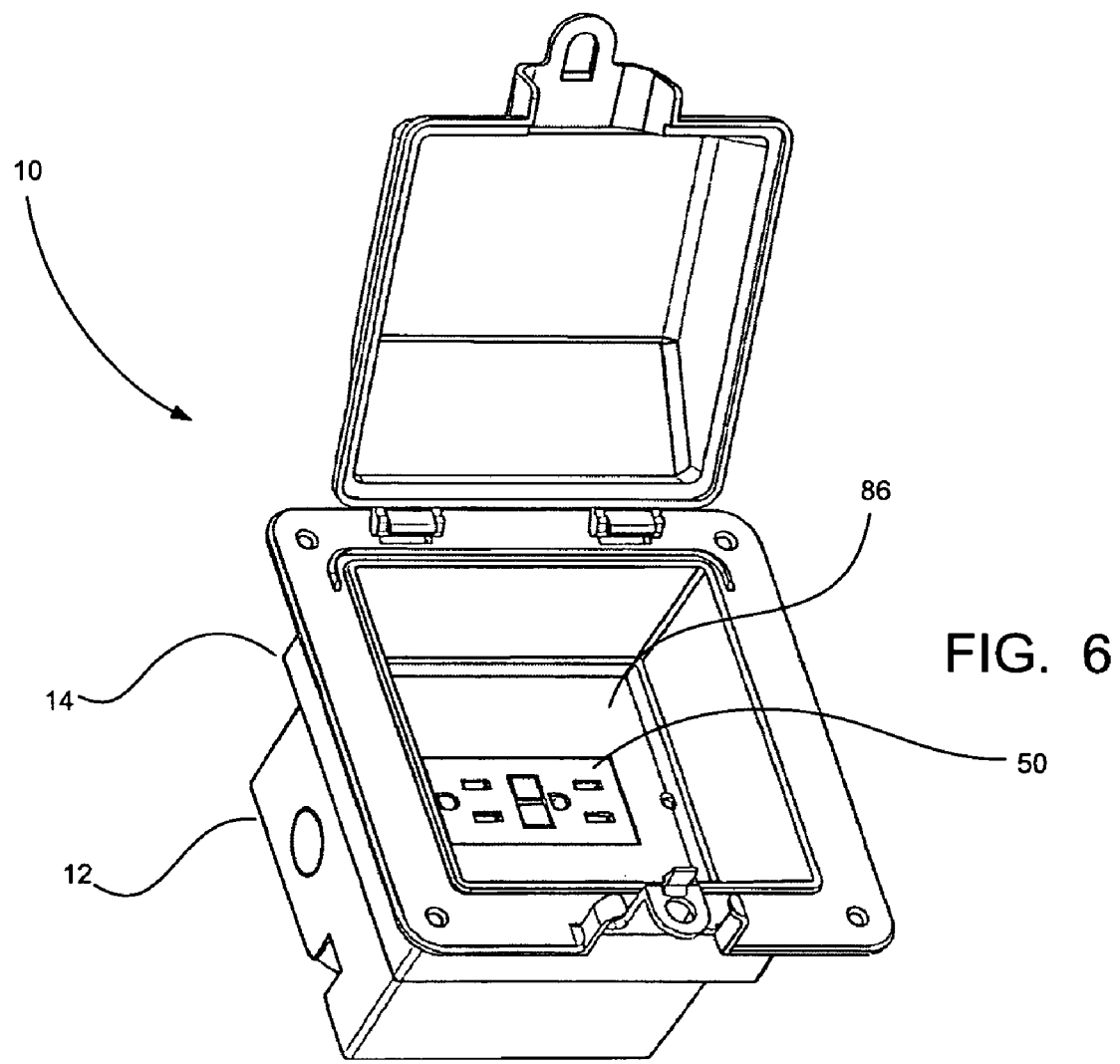
FIG. 6 is a front perspective view showing the single gang configuration of FIG. 5 installed in the electrical box and the cover in an open position.

An installed double gang configuration according to the invention is shown in FIG. 4. The installation of a single gang configuration according to the invention is shown in FIGS. 5 and 6. With the single gang formation, a face plate 86 designed to accommodate a single receptacle is used.

With the electrical box assembly 10 of the invention, the electrical components are attached to adapter plate 40, as opposed to being attached to outlet box 12 or housing 14. In addition, the adapter plate 40 is detachably connected to the interior of the electrical box assembly 10 by snapping the adapter plate to the inside of walls 62 without the use of screws or other fasteners. These features permit the user to change the orientation of the electrical components from vertical (FIG. 4) to horizontal (FIG. 6) without removing the electrical box assembly 10 from the wall. The user can simply "pop-out" the adapter plate and re-orient adapter plate 40 by rotating adapter plate 90 degrees and reinserting adapter plate mounting extensions 44 into adapter plate mounting slots 48, thereby changing the orientation of the electrical components attached or to be attached from horizontal to vertical, or vice versa. This reorientation can occur without having to remove electrical outlet box 12 from the wall. Adapter plate 40 can be removed, for example, by prying out using a flat head screw driver. The ability to re-orient the adapter plate in this manner exists whether the electrical components are attached to adapter plate 40 in a single gang or double gang formation.

Figure 7:
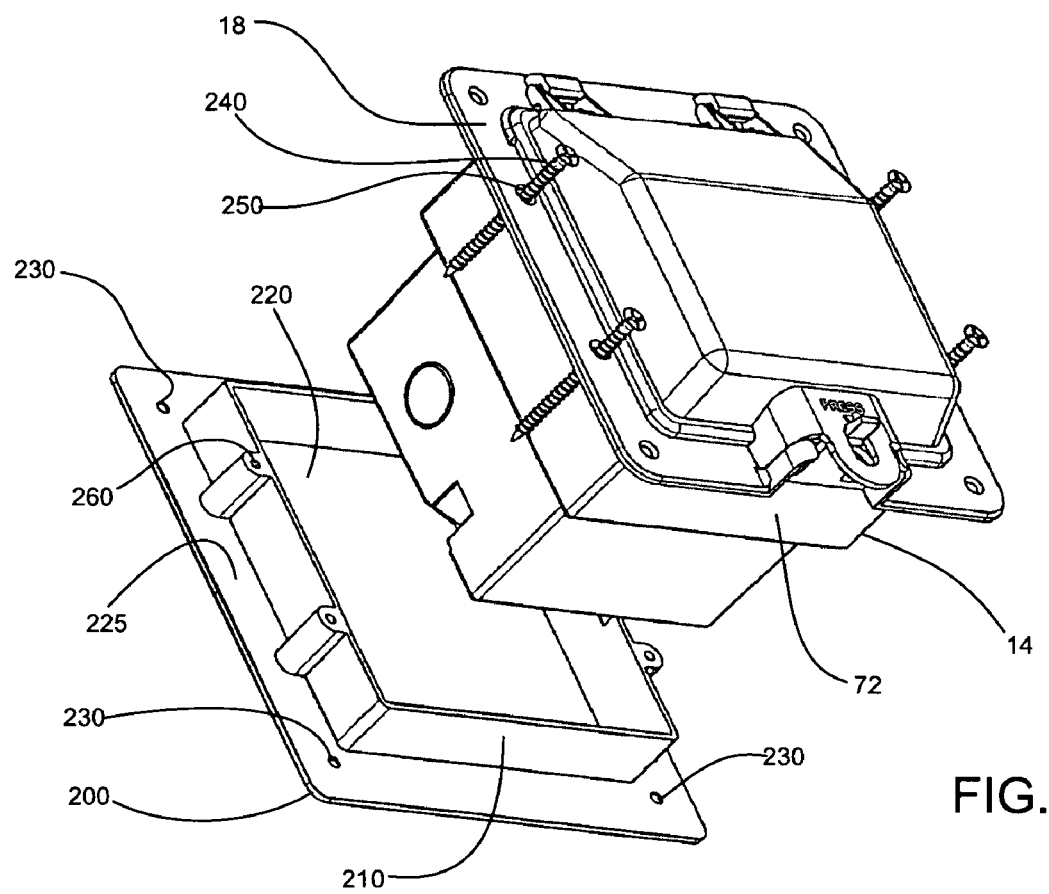
FIG. 7 is an exploded perspective of the electrical box assembly of the invention with a mounting ring.

In another embodiment of the invention, electrical box assembly 10 includes a mounting ring 200. As shown in FIG. 7, mounting ring 200 is generally square in shape and includes side walls 210. Mounting ring 200 can be some other shape as well, its purpose being to accommodate box assembly 10. Mounting ring 200 is also shown as including a mounting ring aperture 220 formed by side walls 210. Mounting ring 200 includes a flange 225 that extends generally perpendicularly outward from side walls 210. Flange 225 includes mounting ring wall apertures 230 for attaching mounting ring 200 to a wall or other support structure (not shown). Electrical box assembly 10 is inserted into mounting ring aperture 220. Mounting ring aperture 220 is configured so that housing 14 fits snugly within mounting ring aperture 220. The height of mounting ring side walls 210 is equal to or less than the height of housing 14.

In operation, mounting ring 200 is mounted to a wall or other support structure (not shown). As shown in FIG. 7, mounting ring 200 can be mounted to a wall by passing the shaft of a nail or screw through mounting ring wall apertures 230 into the wall. Either before or after mounting ring 200 is mounted to a wall, electrical box assembly 10 is detachably secured to mounting ring 200. As shown in FIG. 7, the shaft of a screw 240 is passed through face flange mounting ring aperture 250 and threaded into mounting ring assembly aperture 260.

Figure 8:
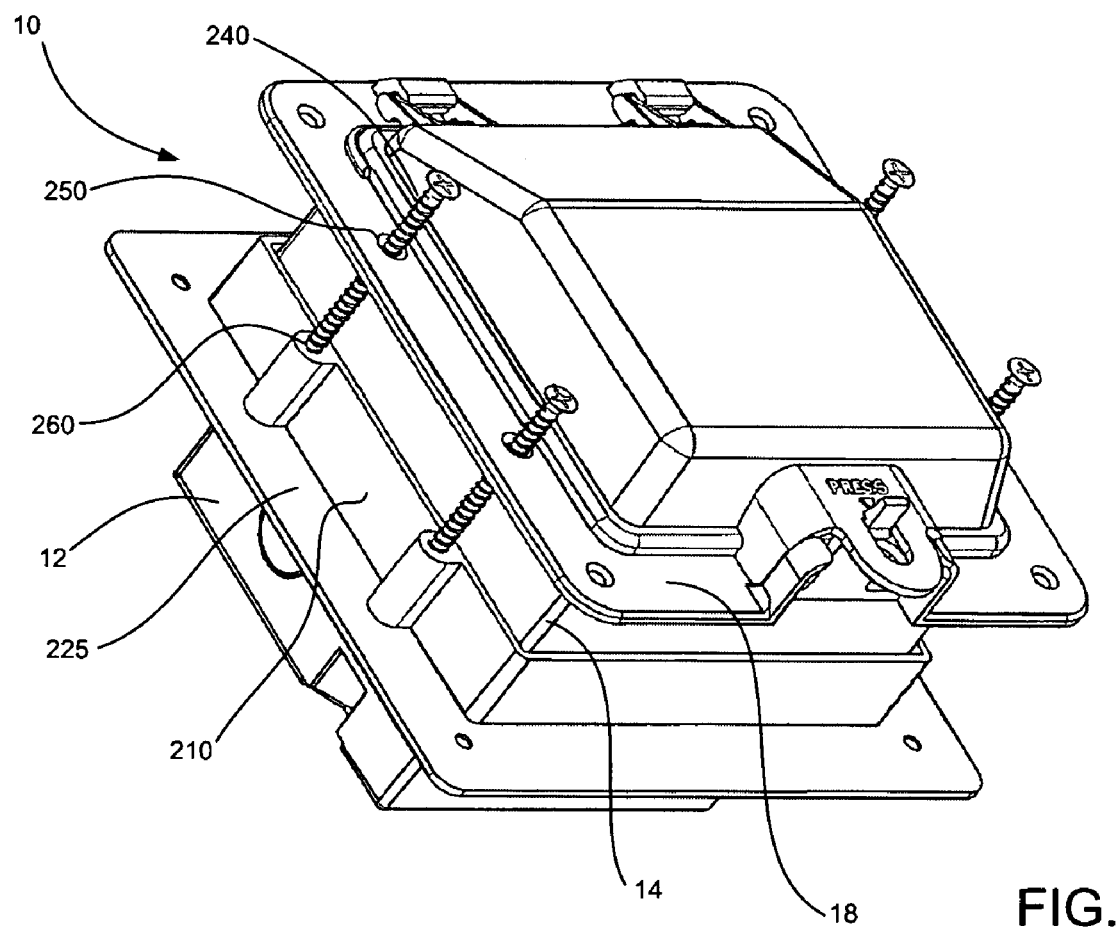
FIG. 8 is a perspective view showing the electrical box assembly of FIG. 7 inserted in a mounting ring surrounding the electrical box assembly.

FIG. 8 shows electrical box assembly 10 detachably secured to mounting ring 200. The rear side of mounting ring flange 225 may be pressed flush against the supporting structure, such as a wall. Electrical outlet box 12 has passed through mounting ring aperture 220 such that housing 14 snugly fits within mounting ring side walls 210. The shaft of a screw 240 has passed through face flange mounting ring aperture 250 and threaded into mounting ring assembly aperture 260. The space between mounting ring flange 225 and face flange 18 can accommodate other materials, such as siding, wallboard, etc. to be place on top of the supporting structure. This additional material will be sandwiched between the front side of mounting ring flange 225 and rear side of face flange 18 when screws 240 are fully tightened.

Alternatively, if no space is desired between the front side of mounting ring flange 225 and rear side of face flange 18, mounting ring 200 can be inverted and placed such that mounting ring side walls 210 fit within a cut-out of the supporting structure, such as a wall. This configuration permits the electrical box assembly 10 to sit essentially flush against the supporting structure.

The electrical box assembly 10 of the present invention may be installed in both new work and old work applications. In old work applications, for example, wall studs would be covered with a facing surface, such as wall board or plaster for interior walls or plywood and siding for exterior applications. In order to install electrical box assembly 10 in an old work application, the back of face flange 18 or mounting ring flange 225 is positioned to abut the facing surface. A nail or screw would be passed through either mounting ring wall apertures 230 or face flange wall aperture 19 into the facing surface as described above. In a new work application where a support structure such as a wall stud would be exposed, outlet box 12 may include a securement device as known in the art for securing the electrical box assembly 10 to the support structure.

Referring to the electrical box assembly FIGS. 9-13, in another embodiment of the invention, electrical box assembly 300 includes electrical outlet box 312 having side walls 362 that do not include a step-out as described above. Rather sidewalls 362 of electrical box 312 extend from the rear wall 364 of electrical box 312 to the face flange 318 in generally a straight manner to form a substantially flat surface. Ridge 326 on face flange 318 defines an opening 313 into electrical box 312.

Figure 9:
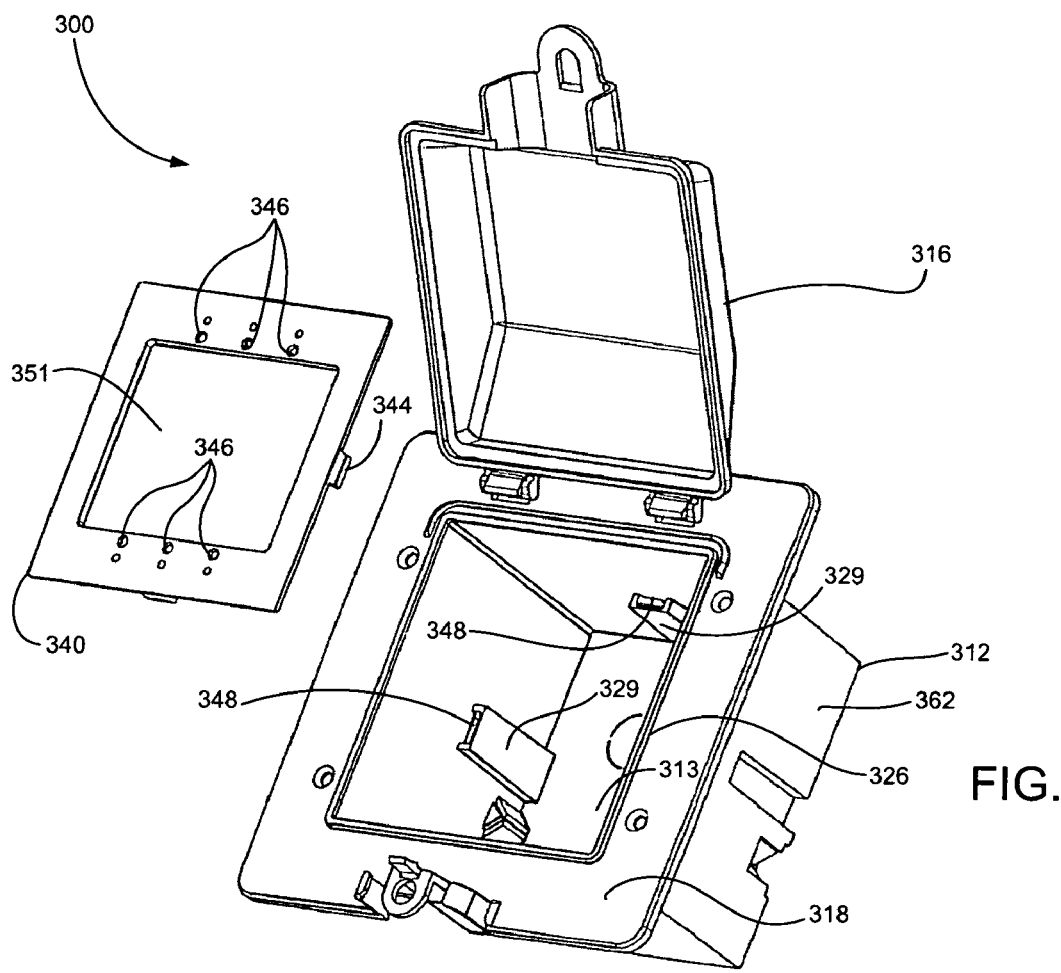
FIG. 9 is a front perspective view of another embodiment of the invention.

Electrical box assembly 300 also includes adapter plate 340. Adapter plate 340 includes an electrical device aperture 351 that is sized to accommodate one or more than one conventional electrical devices, such as duplex outlet or GFCI. As shown in FIGS. 9-13, electrical device aperture 351 in adapter plate 340 can be large enough to accommodate a double gang configuration, i.e., two electrical components, such as outlets or switches, in addition to a single gang configuration. Adapter plate 340 also includes adapter plate screw apertures 346. As discussed above, adapter plate screw apertures 346 permit an electrical device to be removably attached to adapter plate 340. As shown in FIG. 9, a set of three adapter plate screw apertures 346 on opposite sides of adapter plate 340 permits adapter plate 340 to accommodate either a single (middle apertures) or double (outer apertures) gang formation.

Figure 10:
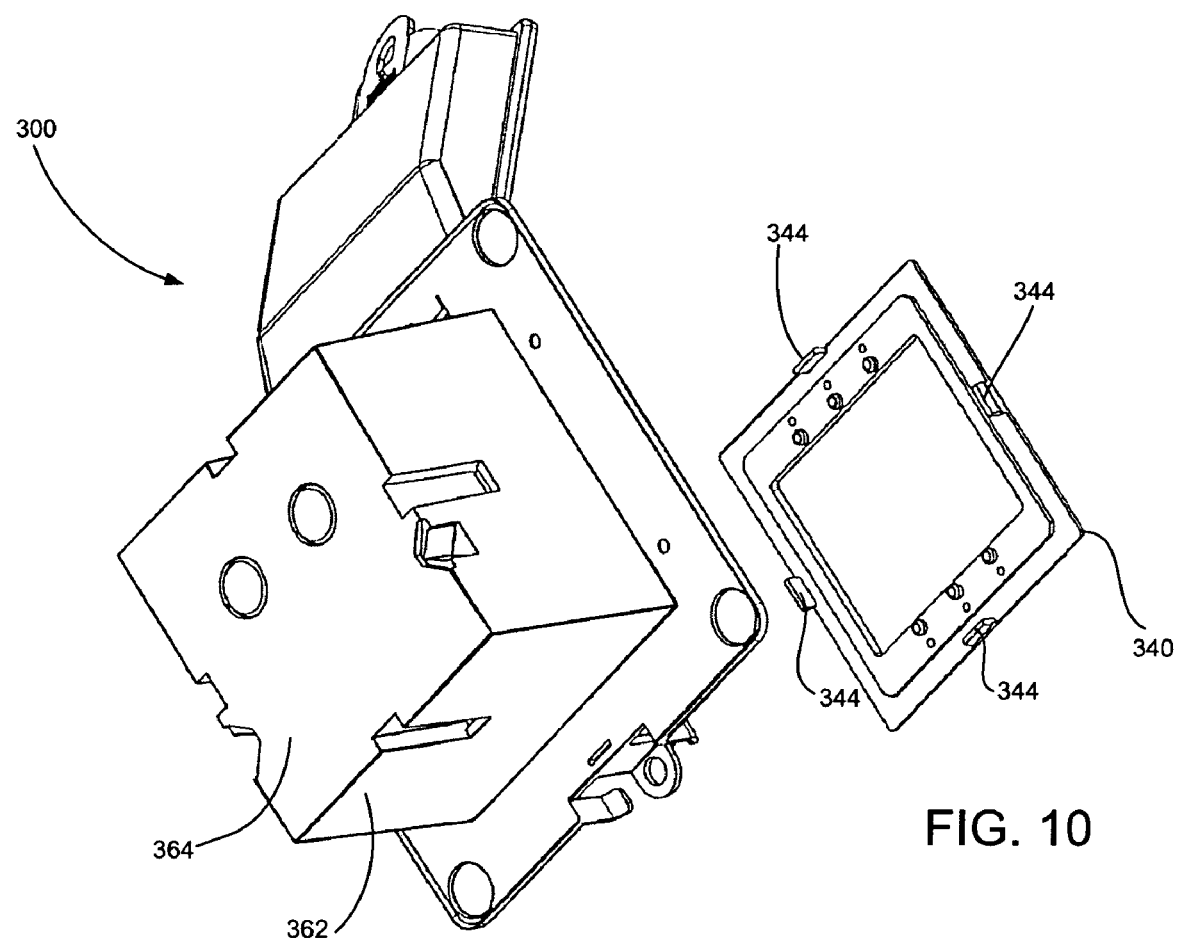
FIG. 10 is a rear perspective view of the electrical box assembly of FIG. 9.
Figures 11A, 11B:
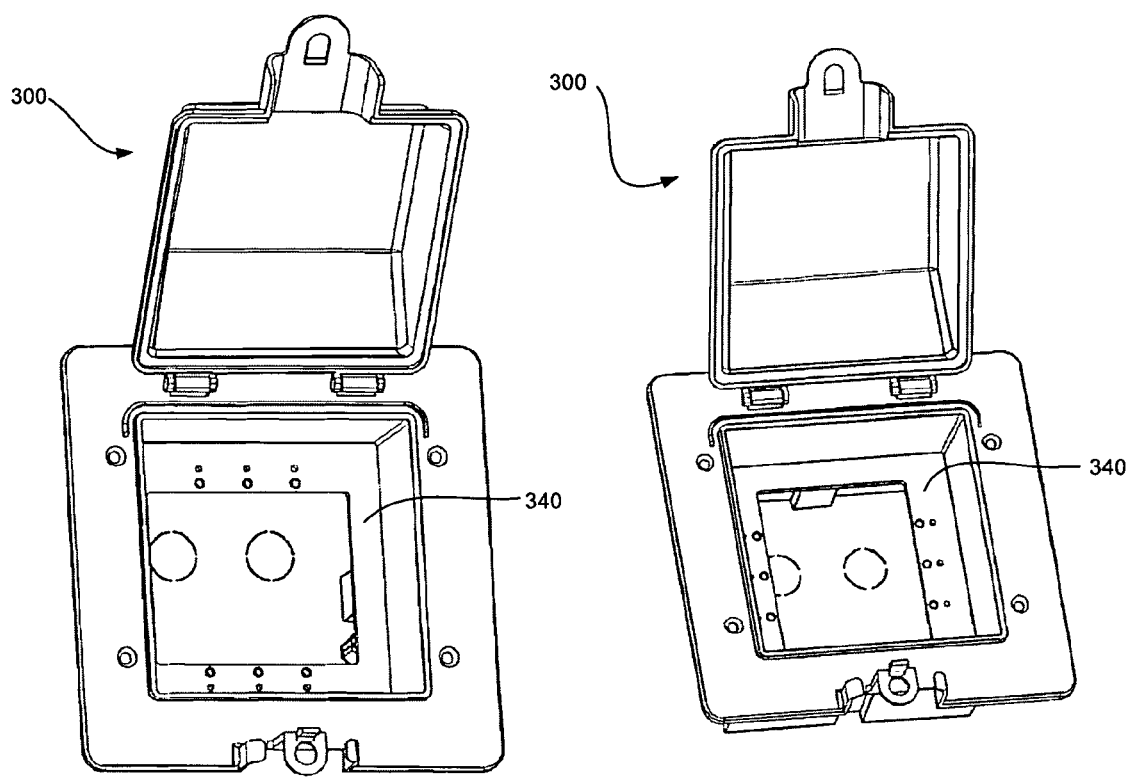
FIG. 11A is a perspective view showing the vertical configuration of the electrical box assembly of FIG. 9.
FIG. 11B is a perspective view showing the horizontal configuration of the electrical box assembly of FIG. 9.

Adapter plate 340 is configured to fit within the opening 313 formed by the side walls 362 of outlet box 312. Adapter plate 340 is also configured to detachably connect to electrical box assembly 310. As shown in FIGS. 9-10, adapter plate 340 includes adapter plate mounting extensions 344. Adapter plate mounting extensions 344 are used to detachably connect adapter plate 340 to electrical outlet box 312. Adapter plate mounting extensions 344 are preferably located in the center of each side of the adapter plate and extend generally rearward from adapter plate 340 toward rear wall 364 of electrical outlet box 312. Other inter-mating configurations are also possible.

Electrical outlet box 312 also includes adapter plate support members 329. Adapter plate support members 329 can project inward from side walls 362 or upward from rear wall 364. Adapter plate support members 329 extend along side walls 362 from rear wall 364 forward toward opening 313. As shown in FIG. 9, the most forward portion of adapter plate support members 329 includes a slot 348. Slots 348 of adapter plate support member 329 are preferably located at the approximate location of where the outer edge of a conventional electrical box would be located. As shown in FIGS. 9-10, this means slots 348 of adapter plate support member 329 are located approximately half way between rear wall 364 and opening 313 bounded by face flange 318. Again, other inter-mating configurations are also possible.

Figure 12:
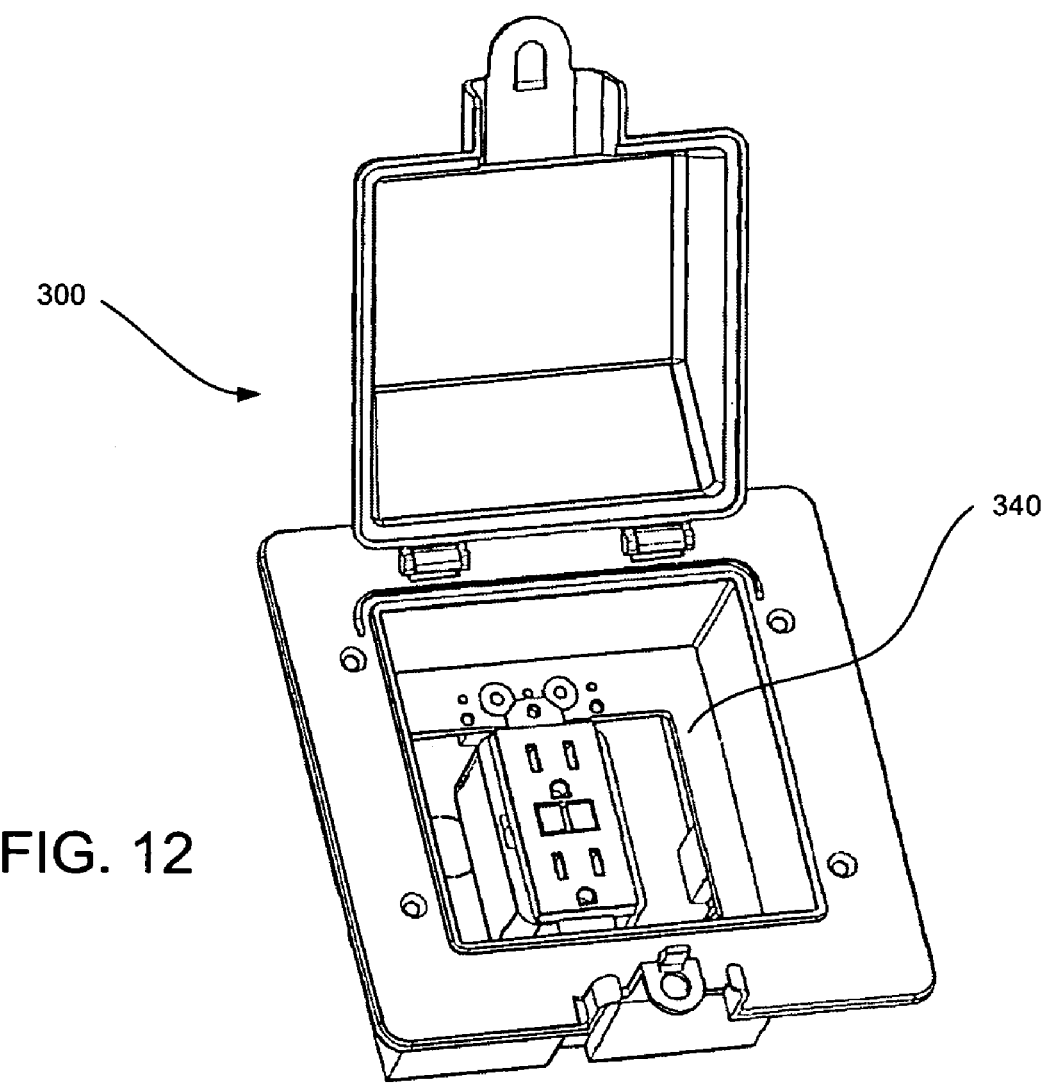
FIG. 12 is a perspective view showing a single gang outlet configuration of the electrical box assembly of FIG. 9.

In operation, before or after the electrical component is mounted to adapter plate 340, adapter plate mounting extensions 344 are inserted into slots 348 of adapter plate support members 329. Adapter plate 340 and/or adapter plate mounting extensions 344 are preferably made of a resilient material, thereby permitting the adapter plate 340 and/or adapter plate mounting extensions 344 to deflect. This deflection permits adapter plate 340 to be snapped into electrical outlet box 312 without the use of a mechanical fasteners, such as screws, rivets, etc. Adapter plate mounting extensions 344 may be configured to engage or snap into slots 348 of adapter plate support members 329, so that a moderate amount of force is necessary to disengage adapter plate 340 from electrical outlet box 312. As stated above, with this configuration, the user can simply "pop-out" adapter plate 340 and re-orient the electrical components by rotating adapter plate 340 90 degrees (or some other set degree depending on the shape of box 312) and reinserting adapter plate mounting extensions 344 into slots 348 of adapter plate mounting extensions 344. These features permit the user to change the orientation of the electrical components from vertical (FIG. 11A) to horizontal (FIG. 11B) without removing the electrical box assembly 300 from the wall. This is true regardless of whether the electrical components are attached to adapter plate 340 in a single gang or double gang formation depending on the particular adapter plate screw apertures 346 employed. FIG. 12 shows the mounting of an outlet to adapter plate 340 in a single gang formation.

Electrical box assembly 300 also preferably includes cover 316. As stated above, cover 316 can be moved to a closed position and is designed to protect the electrical device from the elements. Also as stated above, cover 316 can be held in a closed position by a latching mechanism.

When adapter plate 340 is attached to electrical outlet box 312 via adapter plate support members 329 and adapter plate mounting extensions 344, two separate cavities are defined. The first cavity defined by adapter plate 340, side walls 362 and rear wall 364 is of sufficient depth to house a conventional electrical device, such as an outlet or switch. The second cavity defined by the inside of cover 316, side walls 362 and adapter plate 340 provides a recess sufficient to house a plug of an electrical cord when the plug is plugged into an electrical outlet attached to electrical outlet box 312.

Figure 13:
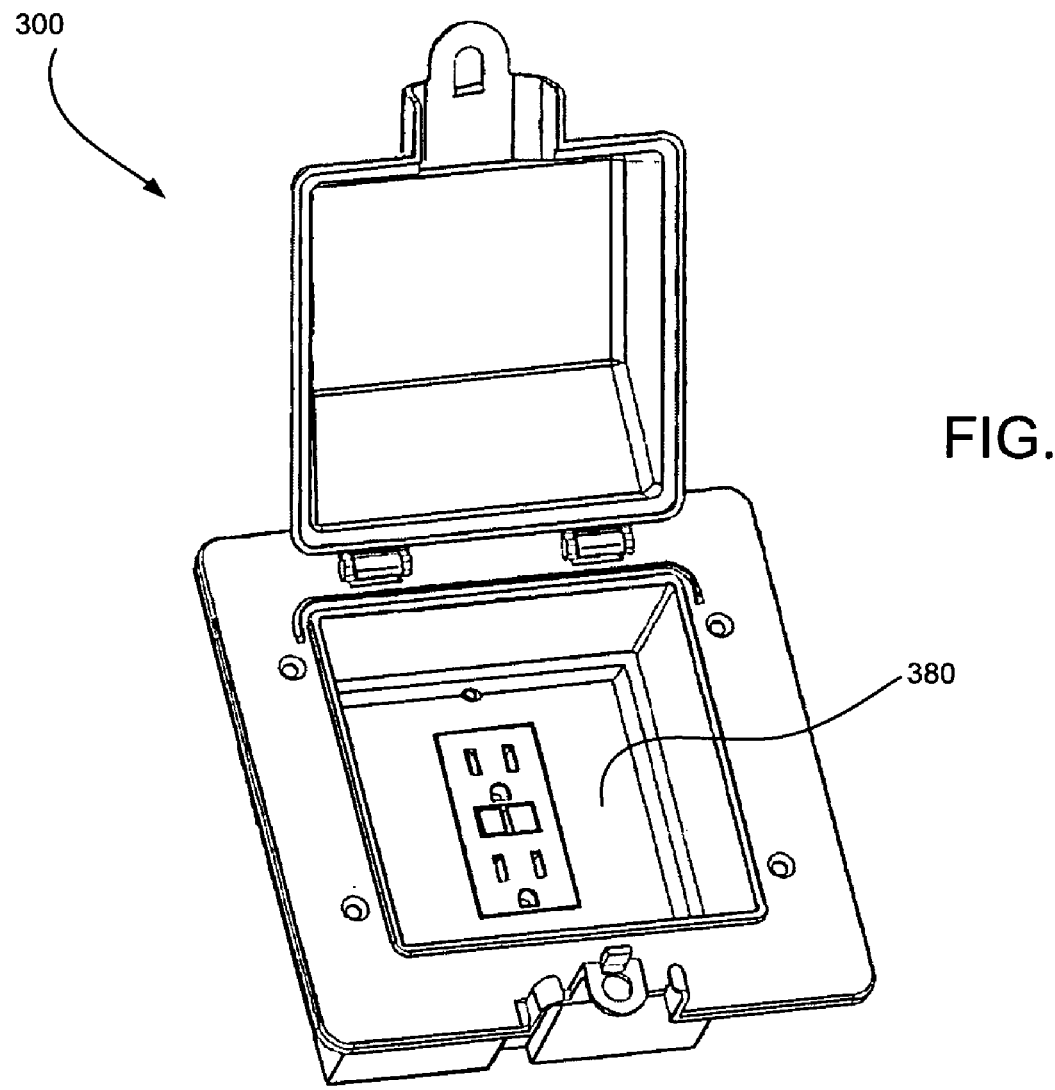
FIG. 13 is a perspective view showing the single gang outlet configuration of the electrical box assembly of FIG. 12 with a face plate.

As shown in FIG. 13, electrical box assembly 300, may include a face plate. As discussed above, face plate 380 is designed to cover the electrical component from view while leaving the face of the electrical component accessible through the face plate aperture.

Although not shown in FIGS. 9-13, mounting ring 200 (shown in FIGS. 7-8) described above may be used in connection with electrical box assembly 300. Mounting ring 200 is configured such that when electrical box assembly 300 is inserted in mounting ring 200, side walls 362 of electrical outlet box 312 fit snugly within the mounting ring aperture 220.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An electrical box assembly comprising:
an electrical outlet box having a rear wall perimetrically bounded by sidewalls extending therefrom, said electrical outlet box adapted to receive at least one electrical component, an adapter plate comprising an adapter plate screw aperture for securing said at least one electrical component to said adapter plate, and an aperture within said adapter plate configured to accommodate said at least one electrical component, an engaging mechanism comprising a fixed structure on said adapter plate which correspondingly interconnects with a fixed structure on said electrical box to removably couple the adapter plate to the electrical box, wherein said engaging mechanism comprises: a plurality of adapter plate mounting slots projecting inward from said sidewalls, and a plurality of adapter plate mounting extensions extending from said adapter plate and configured to engage said adapter plate mounting slots, wherein said engaging mechanism does not include a separate mechanical fastener.

2. An electrical box assembly according to claim 1, wherein said aperture within said adapter plate is configured to accommodate at least two electrical components.

3. An electrical box assembly according to claim 1, wherein said adapter plate has a first position corresponding to a first orientation and a second position corresponding to a second orientation, wherein said adapter plate is removably coupled to said electrical box in one of said first or second positions.

4. An electrical box assembly according to claim 1, wherein said electrical box assembly further comprises a cover pivotally attached to said electrical outlet box, said cover movable between an open and closed position.

5. An electrical box assembly according to claim 4, wherein said electrical box assembly further comprises a latching mechanism configured to reversibly keep said cover in said closed position.

6. An electrical box assembly according to claim 1, further comprising:
a face flange extending outward from said sidewall, and
at least one member extending from said face flange for receiving and retaining an electrical cord.

7. An electrical box assembly comprising:

an electrical outlet box having a rear wall perimetrically bounded by sidewalls extending therefrom, said electrical outlet box adapted to receive at least one electrical component, an adapter plate comprising an adapter plate screw aperture for securing said at least one electrical component to said adapter plate, and an aperture within said adapter plate configured to accommodate said at least one electrical component, an engaging mechanism comprising a fixed structure on said adapter plate which correspondingly interconnects with a fixed structure on said electrical box to removably couple the adapter plate to the electrical box, wherein said engaging mechanism comprises: a plurality of adapter plate mounting slots projecting inward from said sidewalls, and a plurality of adapter plate mounting extensions extending from said adapter plate and configured to engage said adapter plate mounting slots, wherein said engaging mechanism does not include a separate mechanical fastener, wherein said electrical box assembly further comprises a mounting ring adapted to receive said electrical outlet box.

8. An electrical box assembly according to claim 7 wherein said mounting ring is configured to adjustably receive said electrical outlet box therein.

9. An electrical box assembly according to claim 8 wherein said mounting ring is adjustably secured to said electrical outlet box via at least one screw fastener.

* * * * *